United States Patent
Schindler et al.

(10) Patent No.: US 7,026,425 B2
(45) Date of Patent: Apr. 11, 2006

(54) MOISTURE CROSSLINKING ELASTOMER COMPOSITION

(75) Inventors: Wolfram Schindler, Tüssling (DE); Oliver Schäfer, München (DE); Martina Chatzinerantzis, Sauerlach (DE); Bernd Pachaly, Mehring (DE)

(73) Assignee: Consortium fur Elektrochemische Industrie GmbH, Munich (DE)

( * ) Notice: Subject to any disclaimer, the term of this patent is extended or adjusted under 35 U.S.C. 154(b) by 67 days.

(21) Appl. No.: 10/485,668

(22) PCT Filed: Jun. 27, 2002

(86) PCT No.: PCT/EP02/07126

§ 371 (c)(1), (2), (4) Date: Feb. 3, 2004

(87) PCT Pub. No.: WO03/018704

PCT Pub. Date: Mar. 6, 2003

(65) Prior Publication Data

US 2004/0260037 A1 Dec. 23, 2004

(30) Foreign Application Priority Data

Aug. 23, 2001 (DE) ................................ 101 41 235

(51) Int. Cl.
*C08G 77/26* (2006.01)
(52) U.S. Cl. ............................ 528/38; 528/25; 528/28; 528/29; 528/34; 528/44; 528/85
(58) Field of Classification Search .................. 528/25, 528/28, 29, 38, 44
See application file for complete search history.

(56) References Cited

U.S. PATENT DOCUMENTS

| 3,494,951 A | | 2/1970 | Berger | |
|---|---|---|---|---|
| 4,345,053 A | * | 8/1982 | Rizk et al. | ................... 525/440 |
| 4,889,903 A | * | 12/1989 | Baghdachi | ................... 528/17 |

FOREIGN PATENT DOCUMENTS

| DE | 10113980 A1 * | 10/2002 |
|---|---|---|
| EP | 0 250 248 | 12/1987 |
| WO | WO 96/34030 | 10/1996 |
| WO | WO 98/12075 | 3/1998 |

OTHER PUBLICATIONS

I. Yilgor & J.E. McGrath in Adv. Polym. Sci., 1988, 86, pp. 1-86.
I. Yilgor et al. in Polymer, 1984 (25), pp. 1800-1816.
J.J. Hoffmann, C.M. Leir in Polymer Int. 1991 (24), pp. 131-138.

\* cited by examiner

*Primary Examiner*—Marc S. Zimmer
(74) *Attorney, Agent, or Firm*—Brooks Kushman P.C.

(57) ABSTRACT

The invention relates to moisture cross-linking compositions containing (A) 100 parts per weight of a silane-terminated polydiorganosiloxane-urea/urethane copolymer of general formula (1), and (B) between 0.1 and 20 parts per weight of silane of general formula (3): $\Omega\text{-}(CH_2)_e\text{—}Si(R^2)_{3-f}(CH_3)_f$ in which R, X, A, Y, D, B, W, n, a, b, c, d, $\Omega$, $R^2$, e and f are defined as per claim 1.

7 Claims, No Drawings

MOISTURE CROSSLINKING ELASTOMER COMPOSITION

CROSS-REFERENCE TO RELATED APPLICATION

This application claims priority to PCT Appln. No. PCT/EP02/07126 filed Jun. 27, 2002, and to German application DE 101 41 235.5 filed Aug. 23, 2001.

BACKGROUND OF THE INVENTION

1. Field of the Invention

The invention relates to a one-component, reactive, moisture-crosslinking composition based on polydimethylsiloxane-urea/urethane copolymers with alkoxysilane end groups and to the use thereof as a hotmelt adhesive.

2. Background Art

Hotmelt adhesives, or simply hotmelts, are generally physically setting adhesives which at room temperature are present as one component in solid, substantially solvent-free form.

The polymer components or binders of such hotmelt adhesives have a predominantly linear catenary structure and at room temperature are in an amorphous, glasslike or partially crystalline state. In order to attain and set further specific properties such as cohesive strength, viscosity, softening point or setting rate, for example, further additions may be necessary in the adhesive formulation. These additions include tackifying resins for improving the wetting properties and raising the adhesion, plasticizers for raising the flexibility and lowering the melt viscosity, stabilizers and antioxidants for preventing oxidative alteration during processing of the melt under the influence of oxygen, and also for improving the aging behavior of the bonded joint. Additionally, fillers may be used to increase strength and possibly to reduce costs. The principal hotmelt adhesives are based on binder systems such as polyurethanes, epoxy resins, polyamides, ethylene-vinyl acetate copolymers, styrene block copolymers, saturated polyesters, polyolefin copolymers, synthetic rubbers, and mixtures of these systems.

Whereas the amorphous polymers soften over a more or less broad temperature range, the crystalline or partially crystalline polymers display a more or less sharply defined melting point. Amorphous systems of copolyesters, for example, often still exhibit, even at high molar masses, a cold flow and are therefore of only limited usefulness or can be used only in combination with very high molecular mass copolymers.

One way to increase the cohesive strength and dimensional stability under thermal load (adhesive properties even at a relatively high service temperature) of hot melt adhesives is to use reactive adhesives. Reactive formulations of this kind, as a particular form of hotmelts, are known that constitute a combination of physically setting and chemically reacting systems. For this purpose, hydroxy-functional polyesters are generally reacted with an excess of diisocyanates and isocyanate-terminated polymers are prepared therefrom. These polymers are then able to cure, with crosslinking, on ingress of atmospheric moisture. Since a number of weaknesses are inherent in polyurethane hotmelt systems, such as isocyanate monomer emission (monomeric aromatic diisocyanates such as MDI or TDI, and/or their corresponding amines, are suspected of being carcinogenic), $CO_2$ elimination, which leads to formation of bubbles, or the yellowing tendency in the case of aromatic isocyanates, numerous systems are also being developed at present based on silane-crosslinking polymers, which in terms of the aforementioned disadvantages represent a promising alternative. The prepolymers are in this case reacted with silane-functional monomers, so that from said monomers it is likewise possible to prepare moisture-postcrosslinking hotmelt adhesives.

For greater ease of processing, preference is given to one-component systems, since they are easier to apply and can be made subject to automation. Since in the case of reactive hotmelt adhesives the postcure rate formulated for such one-component compositions is usually moderate, in order to ensure sufficient stability on storage, it is more difficult to vary the profile of properties. Problems associated with non-postcrosslinking systems here, conversely, are generally the dimensional stability under thermal load (cold flow, remeltable), the mechanical properties, and the adhesion to the substrate. With the above-described moisture-curing systems these disadvantages are largely avoided. Two-component compositions usually display a significantly improved profile of properties but present problems in terms of processing. The mixing of the components, using static mixers during application, for example, must be uniform in order to ensure a consistent working time and end quality. It is generally necessary here to make a compromise between cure time and working time. The apparatus required for two-component adhesives is also much more complex and hence the application is usually more expensive.

Organosiloxane copolymers, especially polydiorganosiloxane-urethane and polydiorganosiloxane-urea copolymers, are known. The different systems are described in the overview by I. Yilgör and J. E. McGrath in Adv. Polym. Sci., 1988, 86, pp. 1–86. A multiplicity of further publications and patents deal with specific applications of such block copolymers. Polyurethanes and silicone elastomers are complementary within wide regions. Consequently the combination of the two systems yields materials having innovative, excellent properties. Polyurethanes are distinguished by their mechanical strength, elasticity, and very good adhesion and abrasion resistance. Silicone elastomers, on the other hand, possess excellent temperature, UV stability, and weathering stability and special surface properties (low surface tension). They retain their elastic properties at relatively low temperatures and so also do not tend toward embrittlement.

In the overview by I. Yilgör et al. in Polymer, 1984 (25), pp. 1800–1816 the properties of polydiorganosiloxane-urea copolymers were subjected to closer inspection. The silicone and isocyanate polymer building blocks are readily miscible within a wide range. The mechanical properties are determined by the proportion of the different polymer blocks. The polydiorganosiloxanes form the soft segments and are decisive for the elasticity, while the diisocyanates form the hard segments and are critical to the mechanical properties. The development of hydrogen bonds between urethane or urea binding groups determines the mechanical properties. As a result of the strong interactions of the hydrogen bonds between the urea units, these compositions are generally of very high viscosity or solid at room temperature.

The overviews mentioned above describe and discuss a multiplicity of applications and application possibilities. EP-A-250248 describes the preparation and a possible application of these copolymers for nonstick coatings and pressure-sensitive adhesives. WO 96/34030 describes, furthermore, a possible preparation of polysiloxane-urea copolymers having reactive and nonreactive end groups.

SUMMARY OF THE INVENTION

Alkoxysilane-terminated polydimethylsiloxane-urea/urethane copolymers wherein the terminal alkoxysilane groups are linked to the polymer via methylene groups exhibit surprisingly increased cure rates as compared to otherwise similar copolymers employing longer linking groups. The copolymers are particularly useful as hot melt adhesives.

DETAILED DESCRIPTION OF THE PREFERRED EMBODIMENT(S)

The present invention provides moisture-crosslinkable compositions comprising
(A) 100 parts by weight of silane-terminated polydiorganosiloxane-urea/urethane copolymer of the general formula 1

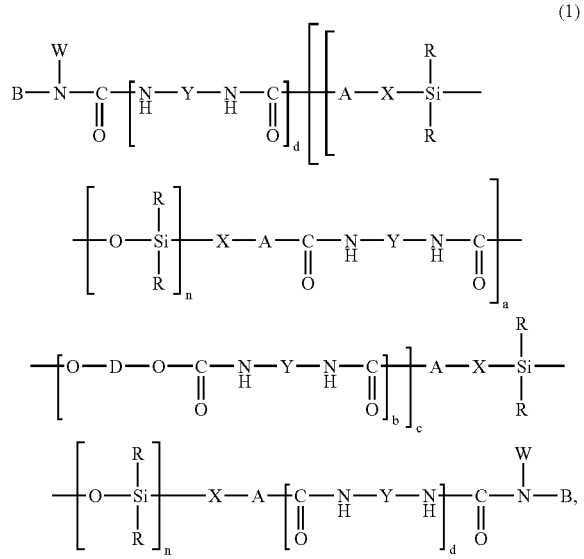
(1)

in which
R denotes a monovalent hydrocarbon radical, unsubstituted or substituted by fluoro or chloro and having 1 to 20 carbon atoms,
X denotes an alkylene radical having 1 to 20 carbon atoms, in which nonadjacent methylene units may have been replaced by —O— groups,
A denotes an oxygen atom or an amino group —NR'—,
R' denotes hydrogen or an alkyl radical having 1 to 10 carbon atoms,
Y denotes a hydrocarbon radical unsubstituted or substituted by fluoro or chloro and having 1 to 20 carbon atoms,
D denotes an alkylene radical unsubstituted or substituted by fluoro, chloro, $C_1$–$C_6$ alkyl or $C_1$–$C_6$ alkyl ester and having 1 to 700 carbon atoms, in which nonadjacent methylene units may have been replaced by —O—, —COO—, —OCO—, or —OCOO— groups,
B denotes a radical of the general formula 2

(2)

Z denotes an alkylene radical having 1 to 10 carbon atoms,
$R^1$ denotes a monovalent hydrocarbon radical unsubstituted or substituted by fluoro or chloro and having 1 to 12 carbon atoms,
R" denotes a moisture-reactive radical selected from $C_1$–$C_4$ alkoxy, $C_1$–$C_{20}$ acyl, $C_1$–$C_6$ alkylaminooxy, and $C_1$–$C_6$ alkyloximo radicals,
W denotes a radical B or hydrogen,
m denotes 0, 1 or 2,
n denotes an integer from 1 to 300,
a denotes an integer which is at least 1,
b denotes 0 or an integer from 1 to 30,
c denotes an integer from 1 to 30, and
d denotes 0 or 1, with the proviso that the composition of the units is chosen such that the copolymer possesses a melting point in the range of 30–200° C., and
(B) from 0.1 to 20 parts by weight of silane of the general formula 3

(3)

where
Ω denotes a group selected from —$NHR^3$, —$NR^3$—$(CH_2)_g$—$NHR^3$, acryloyl, methacryloyl, OCN, —SH, glycidyloxy or chloro radical,
$R^3$ denotes hydrogen or an optionally halogen-substituted $C_{1-18}$ hydrocarbon radical,
$R^2$ denotes a methoxy or ethoxy group,
e denotes 1 or 3,
f denotes 0 or 1, and
g denotes values from 1 to 10.

The compositions based on polydimethylsiloxane-urea/urethane copolymers can be used to very good effect as one-component, reactive hotmelt adhesives which are moisture-crosslinking by way of silane end groups. Copolymer (A) is the binder in the hotmelt adhesive and silane (B) acts as adhesion promoter. Through the appropriate choice of the polymer building blocks for the preparation of the silane-terminated copolymers it is possible in this way to obtain hotmelt adhesives distinguished by outstanding mechanical properties and very good adhesion properties. It is also possible to adjust the application properties such as application temperature, melt viscosities, and processing properties within a wide range.

The hotmelt adhesive is processed in the form of a one-component, solid composition and consequently need not be additionally mixed, prior to application, with further components at a relatively high temperature. Following hot application, the hotmelt adhesive forms, after cooling, an elastic, presolidified material. As a result of the ingress of atmospheric moisture the adhesive cures to form a network by way of silane condensation. In view of the high mechanical strength and the good adhesion properties via the silane end groups, the hotmelt adhesive can be employed for a wide range of elastic bonds between shaped parts.

Preferably R denotes a monovalent hydrocarbon radical, more preferably an alkyl radical having 1 to 6 carbon atoms, in particular unsubstituted. Particularly preferred radicals R are methyl and phenyl.

Preferably X denotes an alkylene radical having 2 to 10 carbon atoms. More preferably the alkylene radical X is uninterrupted. With particular preference X is an n-propyl radical.

Preferably A denotes an amino group, i.e., polysiloxane-urea copolymers are preferred.

Preferably R' denotes hydrogen or an alkyl radical having 1 to 3 carbon atoms, especially hydrogen.

Preferably Y denotes a hydrocarbon radical having 3 to 13, especially 6 carbon atoms, which is preferably unsubstituted.

Preferably D denotes an alkylene radical having 2 to 20, especially 10, carbon atoms, particular preference being given to a radical having four carbon atoms. Likewise preferably D denotes a polyoxyalkylene radical, especially polyoxyethylene radical or polyoxypropylene radical having at least 10 and not more than 200 carbon atoms.

Preferably Z denotes an alkylene radical having 1 to 6 carbon atoms, especially methylene and propylene.

$R^1$ preferably denotes an unsubstituted hydrocarbon radical having 1 to 4 carbon atoms, especially methyl.

Preferably R" denotes a methoxy, ethoxy or acetoxy radical.

n preferably denotes an integer of at least 3, in particular at least 10, and preferably not more than 200, in particular not more than 50.

a preferably denotes an integer of at least 2, in particular at least 5, and preferably not more than 50, in particular not more than 20.

b preferably denotes an integer of not more than 10, c preferably denotes an integer of at least 2 and preferably not more than 10.

The polydiorganosiloxane sections in the copolymer (A) preferably have a molecular weight Mw of from 500 to 30,000, especially 1000 to 8000, more preferably 2000 to 4000.

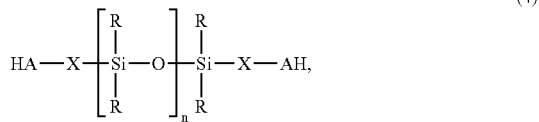

(4)

with diisocyanates of the general formula 5

and silanes of the general formula 6

and, if b is at least 1, additionally with α,ω-OH-terminated alkylenes of the general formula 7

where R, X, A, R', Y, D, B, Z, $R^1$, R", W, m, n, a, b, c and d are as defined for the general formulae 1 and 2 and p denotes 1, E denotes an isocyanate group or an amino group —NHR'", where R'" denotes hydrogen or a monovalent hydrocarbon radical unsubstituted or substituted by fluoro or chloro and having 1 to 12 carbon atoms, or p denotes 2 and E denotes an —NH radical.

The polydiorganosiloxanes of the general formula 4 are preferably largely free from contamination with higher polyfunctional and monofunctional constituents. Monofunctional constituents lead, in the course of reaction to the polymer, to nonreactive end groups, which can no longer be reacted in the end termination by the silanes. Nonreactive end groups lead to problems associated with the polymer structure during the reaction and give rise to products which can in some cases lead to unwanted bleeding from the vulcanisate. Higher polyfunctional polydiorganosiloxanes are also unwanted since in the course of the reaction with diisocyanates they lead to the formation of crosslinking points which lead to branching of the polymer chains during the polyaddition reaction. Materials which have undergone precrosslinking in this way are generally unsuitable for use in terms of processing.

The preparation of aminoalkylpolydiorganosilanes is known and can be carried out, for example, as described by J. J. Hoffmann, C. M. Leir in Polymer Int. 1991 (24), pp. 131–138. Likewise known is the preparation of hydroxyalkylpolydiorganosiloxanes, accomplished for example by hydrosilylating α,ω-dihydro-polydiorganosiloxanes with α,ω-hydroxyalkylenes. Products of this kind are available commercially.

The polydiorganosiloxanes of the general formula 4 preferably have a molecular weight Mw of from 500 to 30,000, especially 1000 to 8000, more preferably 2000 to 4000.

The α,ω-OH-terminated alkylenes of the general formula 7 are preferably polyalkylenes or polyoxyalkylenes. For the same reasons as described for the polydiorganosiloxanes, these alkylenes should preferably be largely free from contamination by monofunctional, trifunctional or higher polyfunctional polyoxyalkylenes. In this context it is possible to use polyetherpolyols, polytetramethylenediols, polyesterpolyols, polycaprolactonediols or else α,ω-OH-terminated alkyls or polyalkylenes having two to 10 carbon atoms or based on polyvinyl acetate, polyvinyl acetate-ethylene copolymers, polyvinyl chloride copolymers, polyisobutyldiols. Preference is given here to α,ω-diols such as ethanediol, butanediol or hexanediol. Compounds of this kind are likewise available commercially.

In the preparation of the copolymer (A) of the general formula 1 it is possible to employ aminoalkylpolydiorganosiloxanes of the general formula 4 in which A denotes an amino group —NR'—, or hydroxyalkylpolydiorganosiloxanes of the general formula 4 in which A denotes an amino group —OH or a mixture of amino- and hydroxyalkylpolydiorganosiloxane, with or without α,ω-OH-terminated alkylenes of the general formula 7. Particular preference is given to using only aminoalkylpolydiorganosiloxane, in which case it is possible, by adding α,ω-OH-terminated alkylenes, especially 1,4-butanediol, to improve further the mechanical properties of the vulcanisates.

Examples of diisocyanates of the general formula 5 are aliphatic compounds such as isophorone diisocyanate, 1,6-hexamethylene diisocyanate, 1,4-tetramethylene diisocyanate and 4,4'-methylenedicyclohexyl diisocyanate, or aromatic compounds such as 4,4'-methylenediphenyl diisocyanate, 2,4-toluene diisocyanate, 2,5-toluene diisocyanate, 2,6-toluene diisocyanate, m-phenylene diisocyanate, p-phenylene diisocyanate, m-xylene diisocyanate, tetramethyl-m-xylene diisocyanate, or mixtures of these isocyanates.

The melting point of the copolymers (A) is essentially determined by the diisocyanate used. Preferably the melting point of the copolymer (A) is 50 to 200° C., in particular 60 to 150° C., preferably 70 to 120° C. In the case of pure polydiorganosiloxane-urea copolymers the melting point of the copolymers (A) is in the range of 50–80° C. when using aliphatic diisocyanates for the polymer synthesis and can reach values of up to 200° C. in the case of aromatic diisocyanates. The incorporation of urethane units, by way, for example, of hydroxyalkylpolydimethylsiloxanes or by way of α,ω-OH-terminated alkylenes, generally results in the lowering of the melting point or in a broadening of the melting range.

The silanes of the general formula 6 can carry reactive groups which react with isocyanate groups. Preference is given here to corresponding aminosilanes. An additional possibility is to use isocyanatosilanes, which can be reacted correspondingly with the OH and NH functions of the prepolymers. As reactive groups which cure under the effect of moisture use is made especially of alkoxy groups.

In an additionally preferred embodiment the copolymers (A) have silane end groups of the general formula 8

$$-CH_2-Si(R^1)_m(R'')_{3-m} \qquad (8).$$

These can be obtained by reacting the polydiorganosiloxanes of the general formula 4 with diisocyanates of the general formula 5 with silanes of the general formula 9

$$Z-CH_2-Si(R^1)_m(R'')_{3-m} \qquad (9).$$

In the general formulae 8 and 9 E, $R^1$, R" and m are as defined above. Preferably E denotes an isocyanato group, $R^1$ denotes methyl, R" denotes a methoxy or ethoxy radical, and m is 0 or 1.

The silane end groups of the general formula 8 possess a very high reactivity, of up to a factor of 100 based on the end groups of the general formula (2), and therefore exhibit outstanding and rapid curing properties for the hotmelt adhesives under atmospheric moisture.

Examples of suitable silanes include aminopropyltriethoxysilane, aminopropyltrimethoxysilane, aminopropylmethyldiethoxysilane, aminopropylmethyldimethoxysilane, aminopropyldimethylmethoxysilane, aminopropyldimethylethoxysilane, aminopropyltri(methylethylketoximo)silane, aminopropylmethyldi(methylethylketoximo)silane, bis(triethoxysilylpropyl)amine, bis(trimethoxysilylpropyl)amine, aminomethyltriethoxysilane, aminomethyltrimethoxysilane, aminomethylmethyldiethoxysilane, aminomethylmethyldimethoxysilane, phenylaminopropyltrimethoxysilane, butylaminopropyltrimethoxysilane, bis(trimethoxysilylpropyl)amine, isocyanatopropyltriethoxysilane, isocyanatopropyltrimethoxysilane, isocyanatopropylmethyldiethoxysilane, isocyanatopropylmethyldimethoxysilane, isocyanatomethyltrimethoxysilane, isocyanatomethyltriethoxysilane isocyanatomethylmethyldiethoxysilane, isocyanatomethylmethyldimethoxysilane, isocyanatomethyldimethylmethoxysilane,
isocyanatomethyldimethylethoxysilane.

Particular preference is given to preparing the copolymers (A) using isocyanatoalkylsilanes or secondary aminosilanes which are particularly suitable for end termination, since after reaction of OH/NH-terminated prepolymers (obtained from the reaction of the polydiorganosiloxanes of the general formula 4 and/or α,ω-OH-terminated alkyls or polyalkylenes of the general formula 7 with diisocyanates of the general formula 5 no further crosslinking reaction with the NH groups resulting from primary aminosilanes is possible. Silane-terminated copolymers of this kind can generally be prepared with much greater reproducibility.

The preparation of copolymers (A) and the subsequent end termination take place either in solution or in an extruder. It is essential here that there is optimum and homogeneous commixing of the constituents. Phase incompatibility between siloxane and polyethers can be prevented where relevant by solubilizers.

To prepare the copolymers (A) the components are preferably reacted in the appropriate molar ratio in a reaction extruder.

For the preparation of the copolymer (A) it is preferred to choose an NCO/OH(NH) ratio by way of the stoichiometry of diisocyanate of the general formula 5 and OH/NH-terminated polydimethylsiloxane of the general formula 4 and, where appropriate, of alkylene of the general formula 7 that is from 0.75 to 1.25, preferably 0.9 to 1.1, more preferably 0.95 to 1.05. The requisite concentration of silane of the general formula 6 is chosen so that isocyanate is no longer detectable in the finished copolymer (determinable by way of standard methods such as IR spectroscopy).

For better reproducibility preparation should take place preferably in the absence of moisture and under inert gas, normally nitrogen or argon, in order to prevent premature curing by hydrolysis of the silane groups. Furthermore, the polymer building blocks used should preferably be baked out beforehand in order to remove low molecular mass impurities and traces of water.

To prepare the copolymers (A) it is preferred to use a catalyst. Suitable catalysts for the preparation are dialkyltin compounds, such as dibutyltin dilaurate, dibutyltin diacetate, for example, or tertiary amines such as N,N-dimethylcyclohexanamine, 2-dimethylaminoethanol, 4-dimethylaminopyridine, for example. This catalyst is at the same time the catalyst for the silane condensation for crosslinking following application. In the case of the pure urea copolymers polymer preparation can also take place without a catalyst, since the amino groups undergo spontaneous and very rapid reaction with the isocyanate groups. Even here, however, it is necessary to incorporate a catalyst into the composition in order to accelerate curing. This may also be of advantage, however, for the preparation of catalyst-free compositions distinguished by an extremely good stability on storage. In the case of highly reactive silanes or for the preparation of compositions which are quick to crosslink it is likewise possible to conceive of incorporating a reactive catalyst directly prior to application.

The reaction of the copolymer (A) can be followed by way of a variety of analytical methods. The reaction is considered over when the NCO band is no longer detectable in the infrared spectrum.

The copolymers (A) are preferably prepared in a suitable solvent. In one preferred embodiment polydiorganosiloxanes of the general formula 4 and, where appropriate, alkylenes of the general formula 7 are reacted with diisocyanates of the general formula 5 and alkoxysilanes of the general formula 6 and where appropriate are subsequently admixed with further constituents before the solvent is removed.

In the case of the silanes (B) which are likewise present in the composition, Ω preferably denotes a group selected from a radical $-NHR^3$, $-NR^3-(CH_2)_g-NHR^3$, and glycidyloxy radical.

$R^3$ is preferably a $C_{1-8}$ cyclic, linear or branched alkyl radical or a $C_{6-18}$ aryl radical, in particular a $C_{1-6}$ alkyl radical.

g is preferably 2, 3, 4 or 5.

Preferred amino-functional silanes (B) include aminopropyltrimethoxysilane, aminopropyltriethoxysilane, aminopropylmethyldimethoxysilane, aminopropylmethyldiethoxysilane, aminoethylaminopropyltrimethoxysilane, aminoethylaminopropyltriethoxysilane, bis(trimethoxysilylpropyl)amino or epoxy-functional silanes such as glycidyloxypropyltrimethoxysilane and glycidyloxypropyltriethoxysilane.

In an additionally preferred embodiment the preparation of the copolymers (A) takes place in an extruder without the addition of further solvents. In the preparation of the composition a second step then comprises incorporating silane (B) and, where appropriate, further additions into the copolymer (A) in the extruder. The extruded composition is solidified by cooling, preferably in the absence of air, and is subjected to size reduction, granulation for example.

In order to improve the adhesion properties and the surface wetting it is possible for the composition, especially for use as a hotmelt adhesive, to include further, tackifying resins, especially silicone resins containing free OH groups or reactive alkoxy groups. The composition preferably contains 5–20 parts by weight of a tackifying silicone resin.

If desired it is also possible for further silanes, such as methyltrimethoxysilane or vinyltrimethoxysilanes, or other customary water scavengers to be present.

In addition it is possible for further customary additives to be present. Fillers such as calcium carbonate, magnesium carbonate, zinc carbonate or else metal oxides such as titanium dioxide or alumina. Further, enforcing fillers such as pyrogenic or precipitated silicas and, additionally, UV absorbers. The compositions may also include, for the purpose of adjusting the processing properties, customary plasticizers, antioxidants, and pigments. The composition preferably contains 5–20 parts by weight of plasticizer.

All of the above symbols in the foregoing formulae have their definitions in each case independently of one another. In all formulae the silicone atom is tetravalent.

In the examples below, unless specified otherwise in each case, all amounts and percentages are by weight and all pressures are 0.10 MPa (abs.). The viscosities were determined on an air-supported cone/plate rheometer (CVO 75, Bohlin). The measuring cone used has a diameter of 1 or 2 cm with a cone angle of 1°. Measurement was carried out with an oscillation frequency of 0–10 Hz. The viscosity at a given temperature was determined from the slope in the shear stress/shear rate diagram. The temperature dependence of the viscosity was determined at a constant shear stress of 5000 Pa.

The molecular masses were determined by means of GPC (HP1090) in toluene (0.5 ml/min) at 23° C.; column: PLgel Mixed C+PLgel 100 A; detector: RI ERC7515.

EXAMPLES

Preparation of isocyanatomethyltrimethoxysilane

Starting from chloromethyltrimethoxysilane, methylcarbamatomethyltrimethoxysilane is synthesized in accordance with known methods (U.S. Pat. No. 3,494,951). The latter silane is pumped in a stream of argon gas into a quartz pyrolysis tube packed with quartz wool. The temperature in the pyrolysis tube is between 420 and 470 C. At the end of the heated section the crude product is condensed by means of a condenser and collected. The colorless liquid is purified by distillation under reduced pressure. The desired product goes over at the top at about 88–90 C (82 mbar) in a purity of more than 99% while in the liquid phase the unreacted carbamate can be isolated again. Said carbamate is recycled directly to the pyrolysis.

Starting from 56.9 g (273 mmol) of methylcarbamatomethyltrimethoxysilane 33.9 g (191 mmol) of the desired product, isocyanatomethyltrimethoxysilane, are obtained in this way in a purity >97%. This corresponds to a yield of 70% of theory.

Example 1a 250 g (66 mmol) of α,ω-bisaminopropylpolydimethylsiloxane having an average molecular weight of 3800 are baked in vacuo at 80° C. for 0.5 h, cooled to 60° C. and subsequently admixed with 250 ml of dry THF. To this solution there is metered in, rapidly, a mixture of 11.2 g (52 mmol) of isophorone diisocyanate and 6.0 g (3.1 mmol) of isocyanatopropyltrimethoxysilane (obtainable from CK-Witco as Silquest® Y-5187). The reaction can be followed from the increase in the viscosity of the solution and by means of FT-IR.

The solution is stirred further at 60° C. for 1 h. The reaction is over when an NCO band is no longer visible in the FI-IR.

Subsequently the THF is stripped off in vacuo. This gives a colorless polymer having a softening range of 85–95° C. and a viscosity of 70 Pas at 90° C.

Investigation of the Cure Behavior:

Essentially two tests are carried out in order to characterize the curing. The polymer solution in THF is admixed with 200 ppm of dibutyltin dilaurate and concentrated by evaporation in vacuo.

a) Qualitative Test to Determine the Melting Range

50–100 mg of substance from the concentrated polymer solution are applied to a glass plate (76×26 mm) and covered with a second glass plate (at an angle of 90°). The sandwich is heated on a hotplate at 2° C. per minute. The melting is monitored by shearing of the two plates against one another at different temperatures. The melting process is over when the two plates can be slid easily with respect to one another. A continuous increase is obtained in the softening temperature from about 105° C. after 2 h, to 150° C. after 5 h and 240° C. after 24 h. After 48 h melting is possible only with partial decomposition at temperatures above 250° C. Curing can be significantly accelerated or retarded by using different alkoxysilanes and amounts of catalyst. Where the silane is isocyanatopropyltrimethoxysilane the rapidity of curing is comparable for all examples; only the viscosities and melting temperatures differ as a function of the polymer composition. Accordingly, the other examples were not evaluated any further. Where the silane is isocyanatomethyltrimethoxysilane the sample can no longer be melted after just 2 h.

b) Determination of Melt Viscosity

Samples concentrated by evaporation and admixed with catalyst (as described above) can likewise be investigated in terms of curing by means of viscometry. In this case the viscosity is investigated temperature-dependently as a function of the curing time in air. In the present example the viscosity rises after 2 h to 15 kPas at 110° C.

Production of Test Specimens for the Tensile Test:

The polymer solution in THF is admixed with 200 ppm of dibutyltin dilaurate and poured out into Teflon dishes (10×10 cm, 5 mm layer thickness) and slowly concentrated by evaporation in vacuo at 25–60° C. The test sheets obtained in this way are stored in air at room temperature for 14 days and then test specimens are punched out. The results of the tensile test (tensile strength, elongation at break, and modulus) are compiled in Table 1.

Production of Test Specimens for Adhesion Test:

The concentrated product described above admixed with 200 ppm is applied from the melt to cleaned test structures (glass, aluminum and PVC, 90×30 mm) and after cooling is stored at room temperature for 14 days. The adhesion is investigated qualitatively by detachment experiments using a metal spatula. Evaluation is qualitative with the following gradation: adhesion (+), partial adhesion (0), no adhesion (−). The results are again compiled in Table 1.

Example 1b 250 g (66 mmol) of α,ω-bisaminopropylpolydimethylsiloxane having an average molecular weight of 3800 are baked in vacuo at 80° C. for 0.5 h, cooled to 60° C. and then admixed with 250 ml of dry THF. To the solution there is metered in, rapidly, a mixture of 11.2 g (52 mmol) of isophorone diisocyanate and 5.5 g (31 mmol) of isocyanatomethyltrimethoxysilane. The reaction can be followed from the increase in viscosity of the solution and by means of FT-IR. The solution is stirred further at 60° C. for 1 h. The reaction is over when an NCO band is no longer visible in the FI-IR. Subsequently the THF is stripped off in vacuo. This gives a colorless polymer having a softening point of 90–100° C. and a viscosity of 80 Pas at 90° C.

Example 2

400 g (110 mmol) of α, ω-bisaminopropylpolydimethylsiloxane having an average molecular weight of 3800 are baked in vacuo at 80° C. for 0.5 h, cooled to 60° C. and subsequently admixed with 550 ml dry THF. To the solution there is metered in, rapidly, a mixture of 24.0 g (96 mmol) of 4,4'-diphenylmethyl diisocyanate and 6.4 g (31 mmol) of isocyanatopropyltrimethoxysilane in 50 ml of dry THF. The reaction can be followed from the increase in the viscosity of the solution and by means of FT-IR. The solution is stirred further at 60° C. for 1 h. The reaction is over when an NCO band is no longer visible in the FI-IR. Subsequently the THF is stripped off in vacuo. This gives a colorless to pale yellowish polymer having a softening range of 145–155° C. and a viscosity of 45 Pas at 150° C.

The adhesion and tensile stretch tests are carried out as described in Example 1.

Example 3

500 g (300 mmol) of α,ω-bisaminopropylpolydimethylsiloxane having an average molecular weight of 1600 are baked in vacuo at 80° C. for 0.5 h, cooled to 60° C. and subsequently admixed with 400 ml of dry THF. To the solution there is metered in, rapidly, a mixture of 55.6 g (260 mmol) of isophorone diisocyanate and 18.0 g (88 mmol) of isocyanatopropyltrimethoxysilane. The reaction can be followed from the increase in the viscosity of the solution and by means of FT-IR. The solution is stirred further at 60° C. for 1 h. The reaction is over when an NCO band is no longer visible in the FI-IR. Subsequently the THF is stripped off in vacuo. This gives a colorless polymer having a softening range of 80–90° C. and a viscosity of 85 Pas at 90° C.

The adhesion and tensile stretch tests are carried out as described in Example 1.

Adhesion: glass (+), aluminum (0), PVC (−)
Tensile strength: 3.10 MPas, elongation at break: 178%, 100% modulus: 1.46 MPas, hardness: 48 Shore A.

Example 4

600 g (85 mmol) of α,ω-bisaminopropylpolydimethylsiloxane having an average molecular weight of 6860 are baked in vacuo at 80° C. for 0.5 h, cooled to 60° C. and subsequently admixed with 600 ml of dry THF. To the solution there is metered in, rapidly, a mixture of 15.0 g (70 mmol) of isophorone diisocyanate and 6.8 g (33 mmol) of isocyanatopropyltrimethoxysilane. The reaction can be followed from the increase in the viscosity of the solution and by means of FT-IR. The solution is stirred further at 60° C. for 1 h. The reaction is over when an NCO band is no longer visible in the FI-IR. Subsequently the THF is stripped off in vacuo. This gives a colorless polymer having a softening range of 75–85° C. and a viscosity of 55 Pas at 80° C.

The adhesion and tensile stretch tests are carried out as described in Example 1.

Adhesion: glass (+), aluminum (0), PVC (−)
Tensile strength: 1.68 MPas, elongation at break: 263%, 100% modulus: 0.86 MPas, hardness: 21 Shore A.

Example 5

400 g (110 mmol) of α,ω-bisaminopropylpolydimethylsiloxane having an average molecular weight of 3800 are baked in vacuo at 80° C. for 0.5 h, cooled to 60° C. and subsequently admixed with 600 ml of dry THF and 2.0 g (22 mmol) of 1,4-butanediol and 200 ppm of dibutyltin dilaurate. To the solution there is metered in, rapidly, a mixture of 24.5 g (115 mmol) of isophorone diisocyanate and 7.8 g (38 mmol) of isocyanatopropyltrimethoxysilane. The reaction can be followed from the increase in the viscosity of the solution and by means of FT-IR. The solution is stirred further at 60° C. for 1 h. The reaction is over when an NCO band is no longer visible in the FI-IR. Subsequently the THF is stripped off in vacuo. This gives a colorless polymer solid at room temperature and having a softening range of 90–100° C. and a viscosity of 65 Pas at 95° C.

The adhesion and tensile stretch tests are carried out as described in Example 1.

Adhesion: glass (+), aluminum (+), PVC (−)
Tensile strength: 3.43 MPas, elongation at break: 473%, 100% modulus: 1.21 MPas, hardness: 45 Shore A.

Example 6

In a twin-screw extruder from Collin, Ebersberg, with 4 heating zones the aminopropyl-terminated silicone oil was metered in the first heating zone under a nitrogen atmosphere. The programmed temperature profile of the heating zones was as follows: zone 1 30° C., zone 2 90° C., zone 3 150° C., and zone 4 140° C.

Rotary speed: 90 min$^{-1}$
Reactant metering:
7.6 g/min (2 mmol/min) α,ω-bisaminopropylpolydimethylsiloxane (Mn=3800)
356 mg/min (1.6 mmol/min) isophorone diisocyanate 100 mg/min (0.5 mmol/min) isocyanatopropyltrimethoxysilane A mixture of isophorone diisocyanate and isocyanatopropyltrimethoxysilane—saturated with nitrogen beforehand— is applied at 40° C. at the beginning of the extruder screws via a metering pump. The isocyanate mixture is then heated in the second heating zone to 90° C. and the reaction extruder is flushed for a few minutes with the two isocyanates with the temperatures set above. At 90° C. the α,ω-bisaminopropylpolydimethylsiloxane—baked at 80° C. in vacuo for 0.5 h beforehand and saturated with nitrogen—is metered in via a metering pump and the mixture is heated to 150° C. in the extruder and thereby completely reacted. The product is extruded via an outlet die at 140° C. and subsequently cooled in a stream of nitrogen. After about 30 minutes the reaction has [lacuna] and the product quality has become consistent. The initial product obtained is discarded.

Then a colorless polymer is obtained having a softening range of 80–90° C. and a viscosity of 75 Pas at 90° C. For greater ease of handling, the product is granulated.

The adhesion and tensile stretch tests are conducted as described in Example 1.

The colorless, slightly turbid product has a softening range of 75–85° C. and a viscosity of 35 Pas at 90° C.

The adhesion and tensile stretch tests are conducted as described in Example 1 and the results are compiled in Table 1.

TABLE 1

Properties of moisture-curing compositions of Example 1–9

| | Example | | | | | | | |
|---|---|---|---|---|---|---|---|---|
| | 1a | 1a | 2 | 7a | 7b | 7c | 8 | 9 |
| Catalyst DBTL/ppm | 200 | 200 | 200 | 200 | 200 | 200 | 200 | 200 |
| Melting point ° C. | 85–95 | 90–100 | 145–155 | 80–90 | 85–95 | 75–85 | 80–90 | 75–85 |
| Viscosity Pas (° C.) | 70 (90) | 80 (90) | 45 (150) | 60 (90) | 90 (90) | 35 (90) | 35 (90) | 20 (90) |
| Tensile strength MPas, DIN 53504 | 2.62 | 2.87 | 4.25 | 2.95 | 3.64 | 2.07 | 2.24 | 3.47 |
| Elongation at break %, DIN 53504 | 216 | 208 | 383 | 164 | 134 | 164 | 170 | 181 |
| Modulus MPas/%, DIN 53504 | 1.46 | 1.65 | 1.71 | 2.12 | 2.96 | 1.51 | 1.35 | 2.18 |
| Hardness [ShoreA], DIN 53505 | 38 | 42 | 48 | 26 | 40 | 25 | 38 | 53 |
| Adhesion/glass | + | + | + | + | + | + | + | + |
| Adhesion/aluminum | 0 | + | 0 | + | + | + | 0 | 0 |
| Adhesion/PVC | − | 0 | − | + | + | + | 0 | − |

Adhesion: glass (+), aluminum (0), PVC (−)
Tensile strength: 2.75 MPas, elongation at break: 243%, 100% modulus: 1.62 MPas, hardness: 42 Shore A Example 7

Following the reaction, 4.0% by weight of aminoethylaminopropyltrimethoxysilane is added to the polymers prepared in accordance with Example 1 (Example 7a), 3 (Example 7b) and 4 (Example 7c) and subsequently the THF is slowly evaporated in vacuo at 25° C.

7a) has a softening range of 80–90° C. and a viscosity of 60 Pas at 90° C.

7b) has a softening range of 85–95° C. and a viscosity of 90 Pas at 90° C.

7c) has a softening range of 75–85° C. and a viscosity of 35 Pas at 90° C.

The adhesion and tensile stretch tests are conducted as described in Example 1 and the results are compiled in Table 1.

Example 8

Following the reaction, 20% by weight of silicone resin (MQ) is added to the polymer prepared in accordance with Example 4 and subsequently the THF is stripped off in vacuo at 60–90° C.

The colorless product has a softening range of 80–90° C. and a viscosity of 35 Pas at 90° C.

The adhesion and tensile stretch tests are conducted as described in Example 1 and the results are compiled in Table 1.

Example 9

Following the reaction, 20% by weight of a trimethylsilyl-terminated silicone oil having a viscosity of 100 mPas is added to the polymer prepared in accordance with Example 3 and subsequently the THF is stripped off in vacuo at 60–90° C.

The invention claimed is:

1. A moisture-crosslinkable composition comprising
(A) 100 parts by weight of at least one silane-terminated polydiorganosiloxane-urea/urethane copolymer of the general formula 1

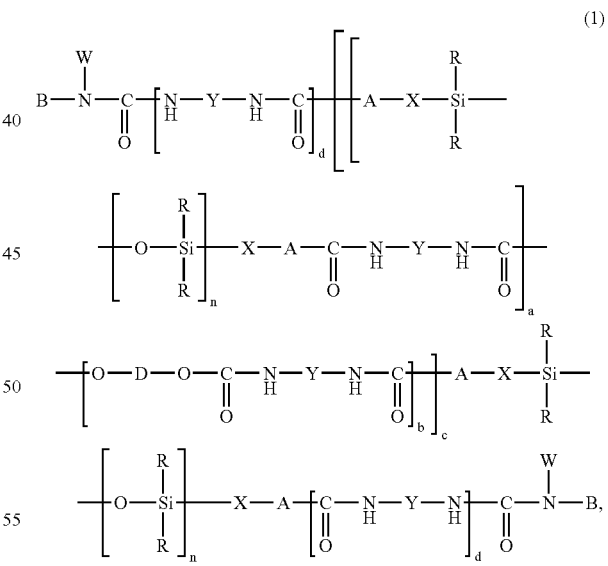

in which
R is a monovalent $C_{1\text{-}20}$ hydrocarbon radical optionally substituted by fluoro or chloro,
X is a $C_{1\text{-}20}$ alkylene radical in which nonadjacent methylene units are optionally replaced by —O—,
A is an oxygen atom or an amino group —NR'—,
R' is hydrogen or a $C_{1\text{-}10}$ alkyl radical,
Y is a $C_{1\text{-}20}$ hydrocarbon radical optionally substituted by fluoro or chloro, D is a $C_{1-700}$ alkylene radical in which nonadjacent methylene units are optionally replaced by —O—, —COO—, —OCO—, or —OCOO— groups, said alkylene radical optionally substituted by fluoro, chloro, $C_1$–$C_6$ alkyl or $C_1$–$C_6$ alkyl ester, B is a radical of the formula 2

$$\text{-Z-Si}(R^1)_m(R'')_{3-m} \quad (2)$$

Z is a methylene radical, $R^1$ is a monovalent $C_{1-12}$ hydrocarbon radical optionally substituted by fluoro or chloro, R" is a moisture-reactive radical selected from the group consisting of $C_1$–$C_4$ alkoxy, $C_1$–$C_{20}$ acyl, $C_1$–$C_6$ alkylaminooxy, $C_1$–$C_6$ alkyloximo, and mixtures thereof, W is a radical B or hydrogen, m is 0, 1 or 2, n is an integer from 1 to 300, a is an integer which is at least 1, b is 0 or an integer from 1 to 30, c is an integer from 1 to 30, and d is 0 or 1, with the proviso that the composition of the units is chosen such that the copolymer possesses a melting point in the range of 30° C. to 200° C., and (B) from 0.1 to 20 parts by weight of at least one silane of the formula 3

$$\Omega\text{-}(CH_2)_e\text{—Si}(R^2)_{3-f}(CH_3)_f \quad (3)$$

where

Ω is a moiety selected from the group consisting of —$NHR^3$, —$NR^3$—$(CH_2)_g$—$NHR^3$, acryloyl, methacryloyl, OCN, —SH, glycidyloxy, and chloro, $R^3$ is hydrogen or an optionally halogen-substituted $C_{1-18}$ hydrocarbon radical, $R^2$ independently are methoxy or ethoxy group, e is 1 or 3, f is 0 or 1, and g is from 1 to 10.

2. The moisture-crosslinkable composition of claim 1, wherein polydiorganosiloxane blocks in copolymer (A) have a molecular weight Mw of from 500 to 30,000.

3. The moisture-crosslinkable composition of claim 1, wherein R are methyl, phenyl, or some R are methyl and some R are phenyl.

4. The moisture-crosslinkable composition of claim 1, wherein A is an amino group.

5. The moisture-crosslinkable composition of claim 1, wherein R" is a methoxy or ethoxy radical, or wherein some R" are methoxy and some R" are ethoxy.

6. The moisture-crosslinkable composition of claim 1, wherein at least one Ω is a moiety selected from the group consisting of —$NHR^3$, —$NR^3$—$(CH_2)_g$—$NHR^3$, and glycidyloxy.

7. A one-component hotmelt adhesive which is moisture-crosslinking by way of silane end groups, comprising at least one moisture-crosslinkable composition of claim 1.

* * * * *